Patented Nov. 28, 1939

2,181,609

UNITED STATES PATENT OFFICE 2,181,609

CELLULOSE COMPOUND COMPOSITIONS

Robert P. Russell, Short Hills, N. J., assignor to Standard Oil Development Company, a corporation of Delaware No Drawing. Application May 15, 1937, Serial No. 142,804

6 Claims. (Cl. 260—17)

This invention deals with the production of superior plastic and film forming materials containing cellulose compounds. More specifically, it relates to the formation of superior compositions containing cellulose compounds and high molecular weight substantially saturated linear aliphatic iso-olefin polymers.

The cellulose compounds suitable for the purposes of this invention are any esters or ethers such as cellulose, acetate, oleate, stearate, naphthenate, acetobutyrate, propionate, laurate, benzyl cellulose, ethyl cellulose, and the like. Cellulose acetate is preferred. Thermoplastic cellulose compounds may be employed but this property is not essential to obtain highly suitable products.

The other essential ingredient of the composition is a substantially saturated linear high molecular weight aliphatic iso-olefin polymer. Examples of such compounds are polyisobutylene, polyisopentene, and the like. The preferred material in this class is polyisobutylene of over 800 molecular weight, say having an average molecular weight of 1,500, 5,000, 40,000, 100,000, 150,000 or even 200,000, as determined by the viscosity method described in Staudinger's "Die Hockmolekularen Organischen Verbindungen," Berlin 1932, Verlag von Julius Springer, page 56 et seq. Polymers of diolefins and isodiolefins and their hydrogenated products are specifically excluded.

These polymer compounds, although having the resilient and stretching properties of rubber when made of high molecular weight, are distinctly different from rubber and superior in many respects to it. For example, they possess practically no unsaturation, their iodine and bromine numbers generally ranging in values less than about 5. Upon ageing for long periods of time, they will not crack and become brittle even without any antioxidant. They do not vulcanize with sulfur in the usual manner. They generally form homogeneous solutions in mineral oils while rubber produces thick stringy gels. Furthermore, for the small increase in viscosity caused by their addition, they increase the viscosity index of lubricating oils to a marked extent. Upon strong heating, they gradually decompose and distil away leaving practically no residue whatever, while rubber, on the other hand, chars and leaves behind a large amount of coke. They also differ in many other respects.

Ordinarily, most materials do not form clear, homogeneous, non-blushing mixtures with the hydrocarbon polymers mentioned herein. It has been found, however, that concentrations as high as 50% can be incorporated into cellulose compounds to give clear, non-blushing films having unexpectedly superior properties.

These two ingredients are dissolved in a mutual solvent, such as a halogenated organic compound, as for example tetrachlorethane. Trichlorethyl, dichlorethylene fluor benzene, ethyl fluorides, and carbon tetrachloride are also suitable.

The amount of hydrocarbon polymer employed is generally from 0.1% to 5 or 10 or even 20%, although in the case of the higher molecular weight cellulose compounds, it is possible to incorporate even 30% or 50% or more.

Upon evaporation of the solvent, a clear transparent film is obtained which will not blush on stretching. The film has exceptionally high strength and water resistance, making it very suitable for coating compositions such as lacquers, paints, etc., wrapping sheets, ejection moldings and other molded plastics, laminated glass, waterproofing cloth, can liners, paper container liners, as an ingredient in lacquer and other coating compositions and the like.

The following example illustrates some of the many phases involved in this invention:

About 80 parts of cellulose acetate of high viscosity were dissolved with 20 parts of polyisobutylene of about 100,000 average molecular weight in 500 parts of tetrachlorethane. Upon evaporation of the solvent at 80° C. a clear film was produced having a high strength and incapable of blushing on stretching.

Various other materials may be incorporated with the above described compositions. For example, dyes, pigments, rubbers, resins, plasticizers, waxes, metal soaps, antioxidants, and the like may be added. The compositions may also be employed as a coating for waterproofing Cellophane and similar materials. Fibers of the compositions herein described may be prepared which are suitable for the preparation of textiles, foundation garments, and the like. The hydrocarbon polymer employed in these compositions may be treated with sulfur chloride, alone or with the cellulose compound in order to give it more solid-like properties.

This invention is not limited by any example given nor by any mechanism of the action involved, but only by the following claims in which it is intended to cover the invention as broadly as the prior art permits.

I claim:

1. A clear homogeneous composition comprising a compound consisting of a cellulose ester of an aliphatic organic acid and not more than approximately 20% of a substantially saturated, linear, aliphatic isoolefin polymer having an average molecular weight above 800 as determined by the viscosity method.

2. A clear homogeneous composition comprising a compound consisting of cellulose acetate and not more than approximately 20% of a substantially saturated, linear, aliphatic isoolefin polymer having an average molecular weight above 800 as determined by the viscosity method.

3. Process for preparing a clear homogeneous composition comprising dissolving in a halogenated solvent a cellulose ester of an aliphatic acid and a substantially saturated linear aliphatic iso-olefine polymer of over 800 molecular weight in the proportion of not over approximately 20% of the cellulose ester, and evaporating off the halogenated solvent.

4. Process according to claim 3, in which the solvent employed is a mutual solvent for both the hydrocarbon polymer and the cellulose compound.

5. Process according to claim 3, in which the solvent is a chlorinated derivative of an aliphatic hydrocarbon having two carbon atoms.

6. A coating composition comprising a cellulose acetate-polyisobutylene mixture of which 0.1 to 20% is polyisobutylene of 40,000 to 200,000 average molecular weight, sufficient chlorinated ethane being added to said mixture to produce a uniform mobile product.

ROBERT P. RUSSELL.